United States Patent Office 3,306,924
Patented Feb. 28, 1967

3,306,924
METHOD OF PREPARING ALUMINUM ALKYL HALIDES
Giorgio Moretti, Milan, and Alfredo Turchi, Ferrara, Italy, assignors to Montecatini Edison S.p.A., Milan, Italy
No Drawing. Filed May 21, 1963, Ser. No. 282,131
Claims priority, application Italy, May 25, 1962, 10,517/62
10 Claims. (Cl. 260—448)

The present invention relates to a new method for preparing aluminum alkyl halides of the general formula $R_mAl_pX_n$, wherein R is an alkyl group, desirably containing from about 2 to 10 carbon atoms; X=halogen; m, n, and p, are integers, and $m+n=3$ when $p=1$, and $m=n=3$ when $p=2$.

The foregoing aluminum organometallic compounds have considerable application as components of stereospecific catalysts used in the polymerization of olefins.

Several different methods for their preparation are already known. Such prior-art methods include:

(a) The reaction of an alkyl halide with aluminum powder or chips; this method only permits the obtaining of aluminum alkyl sesquihalide ($R_3Al_2X_3$), and thereafter a partial dehalogenation with sodium has to be carried out in order to obtain the desired dialkyl aluminum monohalide. The sodium, which is converted to NaCl, is not recoverable.

(b) The reaction of an alkyl halide with Al-Mg alloy; aluminum dialkyl monohalide is obtained, however this method involves the consumption of a large amount of magnesium.

(c) The reaction of an aluminum trialkyl with aluminum trihalide; by varying the molar ratios of the reactants, all of the various aluminum alkyl halides can be obtained. In order to utilize this method, however, it is necessary to use perfectly anhydrous aluminum trihalides, and this is rather difficult owing to their inherent hygroscopicity.

(d) The reaction of aluminum trialkyls with halogens: in this instance, only 50% of the halogen is utilized.

We have now found a novel process for preparing alumnium alkyl mono- and di-halides, which process is free from the various drawbacks of the prior-art techniques. Our process comprises reacting a hydrohalic acid with an aluminum dialkyl monohydride.

An aluminum dialkyl monohydride is prepared, for instance, as an intermediate product in the synthesis of aluminum trialkyls, using aluminum, olefin and hydrogen under pressure, according to methods disclosed in the art. Thus, rather than carrying out the complete reaction (1), only the partial reaction (2) is carried out.

(1) $Al+3C_nH_{2n}+3/2H_2 \rightarrow Al(C_nH_{2n+1})_3$ (2) $Al+2C_nH_{2n}+3/2H_2 \rightarrow Al(C_nH_{2n+1})_2H$ Partial reaction (2) is effected by operating with less olefin than is required to carry out reaction (1).

We have now found that when the aluminum dialkyl monohydride is treated with a hydrohalic acid, gas release occurs as well as the formation of an aluminum alkyl mono- or di-halide, with very high yields.

The hydrohalic acid must be employed in the stoichiometric quantity with respect to the aluminum, or even in slight excess. The reaction occurs readily at room temperature. Generally, in order to fully complete the reaction it is preferred to heat to a temperature of from about 80 to 100° C. for an appropriate period of time. The time required will, of course, vary depending upon the particular hydride and acid which are employed.

The reaction can be carried out at ordinary pressure (atmospheric) while continuously removing the gaseous reaction products, or it can be carried out under pressure. In this latter case, it is desirable to vent the reactor at intervals in order to remove the reaction products.

A stream of gaseous hydrohalic acid may be caused to bubble through the liquid; or it may be made to lap the surface of the liquid, while providing agitation.

The reaction can be carried out using the aluminum alkyl hydride in the absence of a solvent, or a solution thereof in hydrocarbon solvents can be used.

Our process is advantageous in that it permits, in the synthesis of aluminum alkyl monohalides, the use of aluminum dialkyl monohydride, rather than requiring the use of aluminum trialkyls according to the known processes (above mentioned c and d methods). Thus, partial reaction (2) is more easy and economical to carry out than is overall reaction (1).

Moreover, owing to the lower molecular weight of the monohydride as compared to the aluminum trialkyl, the volumes being equal, a larger molar quantity of organometallic compound can be obtained, and thus also a higher output of the synthesis reactor.

Another advantage of the process of our invention is that the aluminum dialkyl monohydride may be employed directly, without subjecting it to any separation or purification, because the only byproduct occurring therein (in variable amounts, depending upon the specific operative conditions, but always being present to some degree) is the corresponding aluminum trialkyl, and the trialkyl reacts with hydrohalic acid in an analogous manner, as is disclosed in copending application Ser. No. 282,130, filed of even date herewith.

It is to be understood, however, that the process of this invention is applicable using any aluminum dialkyl monohydride, regardless of how prepared.

Finally, it is to be noticed that the reaction with hydrohalic acid results in either concentrated organometallic compounds or solutions thereof, each of which remains perfectly clear. Thus, there is no need to subject the product to distillation prior to utilizing such product.

The following examples will further illustrate the present invention. All parts are by weight unless otherwise stated.

*Example 1*

88 g. of a product prepared by the reaction of aluminum, ethylene and hydrogen at 100° C. and under a pressure of 150–200 atmospheres, the reaction carried out with a deficiency of ethylene, are introduced in a 500 ml., 4-necked glass flask provided with thermometer, reflux condenser, stirrer and gas inlet pipe, the flask being connected at the cooler side to a gas meter and being kept under an atmosphere of anhydrous nitrogen.

The foregoing product has an aluminum content of 28.5% and is constituted of a mixture of $Et_2AlH$ and $Et_3Al$, with about 73% of the former product $$(Et=C_2H_5)$$

22 N liters of anhydrous HCl are introduced gradually and cause to lap the surface of the liquid while under stirring. There is a remarkable evolution of heat, so that the flask must be cooled by immersing it in cold heptane so as to maintain the internal temperature at about 20–25° C. About 21.6 N liters of a gas are released, which gas, by gas-chromatographic analysis, is shown to consist of 80% $H_2$, the remainder being ethane along with traces of butane.

The reaction liquid, after the HCl addition, is still clear. It is distilled under a high vacuum, to thereby obtain 105 g. of a product which on analysis shows the following characteristics: Al=21.85%; Cl=30.2%; gas released by decomposition with 2-ethylhexyl alcohol: 343.6 N cc./g., this gas having a composition (as determined by gas-chromatographic analysis) of: ethane=97.5%; H$_2$=1%; butanes=1.5%; and traces of other hydrocarbons.

The product is thus constituted essentially of Et$_2$AlCl (theoretical Al content=22.4% theoretical Cl content =29.4%; theoretical amount of released gas: 372 N cc./g.).

*Example 2*

Employing the equipment described in Example 1, 55 g. Et$_2$AlH are introduced into the flask. This compound had been obtained by distillation, under high vacuum (0.02 mm. Hg) using a thin film molecular distiller, of a synthesis product of aluminum, ethylene and hydrogen, obtained at 100° C. under 200 atmospheres of pressure, with a deficiency of ethylene. This compound, after distillation, shows an aluminum content of 29.45% and, by decomposition with 2-ethylhexyl alcohol, releases a gas which is 33% H$_2$, the remainder being ethane along with 2.4% butane. Thus, the foregoing compound is essentially formed of Et$_2$AlH.

14.8 N liters of anhydrous HCl are caused to lap the liquid, which is maintained under agitation, while operating according to the procedure described in Example 1, namely, keeping the temperature between 20° and 25° C. When the HCl addition is completed, the temperature is raised to 80° C. for 90 minutes. 15.7 N liters of a gas are released which, on gas-chromatographic analysis, proves to be 86% H$_2$, the remainder being ethane, along with traces of butane.

Subsequently the product is distilled under high vacuum, to obtain 70.7 g. of a product having the following analytical characteristics: Al=22.6%; Cl=31.65%; by decomposition with 2-ethylhexyl alcohol, 350 N cc./g. of a gas are released which, on gas chromatographic analysis, proves to be 98.5% ethane, the remainder being butane with traces of hydrogen. Therefore the product is constituted essentially of Et$_2$AlCl.

*Example 3*

In the equipment described in Example 1, 60.5 g. Et$_2$AlH are introduced, which Et$_2$AlH shows the same analytical characteristics as the Et$_2$AlH described in Example 2 (corresponding to 0.66 gram atom Al) and 116 g. anhydrous technical heptane. The solution is stirred thoroughly and about 15.5 N liters (corresponding to about 0.7 mole) of anhydrous HCl are bubbled therein, while keeping the reaction mixture at room temperature. At the end of the HCl addition the solution is heated to the boiling point for 90 minutes. About 16.0 N liters of a gas are released which, on gas-chromatographic analysis, proves to be 81% H$_2$, the remainder being C$_2$H$_6$, with very little traces of butanes. The solution, which after the reaction remains completely clear, weighs 194 g. When analysed it exhibits the following characteristics: Al=8.96%; Cl=11.6% (Al/Cl ratio in gram atoms =1.015). Thus the product is formed of Et$_2$AlCl.

*Example 4*

By operating with the same equipment described in Example 1 and the reactants of Example 2, 51.5 g. Et$_2$AlH (corresponding to about 0.56 gram atom Al) are introduced into the flask. Then about 28 N liters of anhydrous gaseous HCl are allowed to lap the liquid surface, while following the procedure described in Example 1. When the HCl addition is completed, the solution is heated to 100° C. for 90 minutes. During the reaction about 28 N liters of a gas are released, which on gas-chromatographic analysis, proves to be formed of about 47% H$_2$, the remainder being ethane with traces of butanes.

The reaction liquid remains clear after the acid addition. It is distilled under a high vacuum to obtain 69 g. of a product which on analysis shows the following characteristics: Al=20.68%; Cl=54.68%; gas released by decomposition with 2-ethylhexyl alcohol: 155 N cc./g. This gas, when analyzed by gas-chromatographic techniques, proves to be formed of 94.5% ethane, 5.5% butanes, and minute quantities of H$_2$. Thus, the product is constituted essentially of EtAlCl$_2$ (theoretical values: Al=21.27%; Cl=55.8%; theoretical amount of released gas: 176.6 N cc./g.).

*Example 5*

23 g. Et$_2$AlH are introduced in a 250 ml. flask provided with a stirrer, an inlet tap for reactant gas, and a tap for reaction gas discharge to a gas meter. The flask is placed under an atmosphere of anhydrous nitrogen.

(The Et$_2$AlH had been obtained by distillation, under high vacuum (0.02 mm. Hg) in a thin film molecular still, of a synthesis product of aluminum alkyls, obtained from ethylene, aluminum and hydrogen, at 100° C. and 200 atmospheres, with a deficiency of ethylene. This product, after distillation, had an aluminum content of 29.35% and, by decomposition with 2-ethylhexyl alcohol, released a gas which on gas-chromatographic analysis, proved to be about 30.5% H$_2$, the remainder being ethane with small amounts of butane. The product was therefore constituted essentially of Et$_2$AlH.)

About 6 N liters anhydrous gaseous HBr are allowed to lap the liquid while continuously agitating. When the HBr addition is completed, the temperature is raised to 100° C. for 60 minutes. The reaction causes the evolution of about 6 N liters of a gas, which gas, by gas-chromatographic analysis, proves to be constituted of 83.5% H$_2$, the remainder being ethane with small amounts of butane. The liquid, after the reaction, is clear and colorless.

The liquid is distilled under high vacuum to obtain 38 g. of a product which, on analysis, shows: Al=16.4%; Br=48.5%; by decomposition with 2-ethylhexyl alcohol, there is released 254.5 N cc./g. of a gas which, when analyzed by gas-chromatographic techniques, shows the following composition: 96.6% ethane, 2% H$_2$, 1.1% butane. The product is thus essentially constituted of Et$_2$AlBr. (Theoretical values: Al=16.36%; Br=48.47%; theoretical amount of released gas=268 N cc./g.)

*Example 6*

About 74 g. Et$_2$AlH (corresponding to 0.8 g. atom Al) are introduced into a small 3-necked flask of 250 ml., provided with an inlet pipe for reactant gas, a thermometer, a Liebig condenser connected to a collection flask of 250 ml. provided with vacuum tap and connected with a gas meter, the whole having previously been placed under an anhydrous nitrogen atmosphere. The Et$_2$AlH product has the same characteristics as that described in Example 5.

Following the procedure described in Example 1, 108 g. of anhydrous gaseous HI are allowed to enter said liquid kept under stirring.

When HI addition is completed, the temperature is raised to 100° C. for 40 minutes. During the reaction about 19 N liters of a gas are evolved, which gas, on analysis by gas-chromatographic techniques, is shown to be 70% H$_2$, the remainder being ethane with a small amount of butanes.

The liquid, after the reaction, is clear and colorless. It is distilled under a strong vacuum to thereby obtain about 164 g. of a product showing the following analytical composition: Al=12.58%; I=58.27%.

The product is treated with 2-ethylhexyl alcohol and decomposes to release 219.2 N cc./g. of a gas, which gas, when analyzed by gas-chromatographic techniques, is shown to have the following composition: about 87% ethane; 6% butanes; about 7% H$_2$.

Thus, the foregoing product is constituted essentially of Et$_2$AlI. (Theoretical amount: Al=12.7%; I=59.8%; theoretical amount of released gas=211 N cc./g.)

*Example 7*

Employing the same equipment as described in Example 6, about 28 g. of Et$_2$AlH, corresponding to 0.3 g. atom Al (this product showing the same analytical characteristics as that employed in Example 5) are introduced into the flask together with about 39 g. AlEt₃ (corresponding to 0.3 g. atom Al; analytical characteristics: Al=22.95%).

About 15 N liters of anhydrous HCl are allowed to lap liquid during continuous agitation according to the procedure described in Example 1. When the gas addition is completed, the mixture, which has remained clear and colorless, is heated to 80° C. for 60 minutes.

From the reaction, about 15 N liters of a gas are released, which gas, on analysis by gas-chromatographic techniques, is shown to be about 38% H₂, the remainder being ethane with small amounts of butanes.

The product is distilled under a high vacuum to obtain 71 g. of a product having the following analytical characteristics: Al=21.5%; Cl=30.8%; when decomposed with 2-ethylhexyl alcohol the product releases 345 N cc./g. of a gas which, on analysis by gas-chromatographic techniques, is shown to be formed of ethane (98.5%) with a small amount of butane and traces of H₂. Thus, the product is constituted essentially of Et₂AlCl.

*Example 8*

Employing the same equipment as described in Example 6, 88 g. (corresponding to 0.38 g. atom Al) are introduced of a product which had been prepared by reacting Al, H₂ and isobutene at 120° C. under 200 atmospheres while operating with a deficiency of isobutene. This product shows an aluminum content of 17.9% and hence is essentially constituted of aluminum di-isobutyl monohydride.

Following the procedure described in Example 1, the liquid surface is lapped by about 13 N liters anhydrous HCl. When the gas addition is completed the product is heated at 80° C. for 60 minutes.

From the reaction about 14 N liters of a gas are evolved, which gas, on gas-chromatographic analysis, is shown to be formed essentially of H₂ with traces of butanes and ethane. The product is distilled under a strong vacuum to obtain 94.5 g. of a product showing the following analytical characteristics: Al=15.30%; Cl=19.1; by decomposition with 2-ethylhexyl alcohol, the product releases 257 N cc./g. of a gas essentially constituted of isobutane with small amounts of propane, butane and hydrogen.

Thus, the product is essentially constituted of

Al(C₄H₉)₂Cl (Theoretical contents: Al=15.3%; Cl=19.8%; theoretical amount of released gas=254 cc./g.)

*Example 9*

Using the same equipment and operative procedure described in Example 1, 114.1 g. Al(n-C₃H₇)₂H having an Al content of 23% (theoretical content=23.6%) are allowed to react with 22.6 Nl. HCl From the reaction, 22.5 Nl. of a gas are evolved, which gas is constituted essentially of hydrogen with small amounts of propane, as shown by gas-chromatographic analysis. The reaction product shows the following analysis:

Al: 17.0% (theoretical content: 17.6%)
Cl: 24.4% (theoretical content: 24.2%)

It therefore consists of 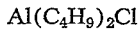 (n-C₃H₇)₂AlCl.

*Example 10*

Using the same equipment and operative procedure described in Example 1, 195 g. (n-C₄H₉)AlH having an Al content of 18.8% (theoretical content=19%) are allowed to react with 22.6 Nl HCl.

From the reaction, 22.3 Nl. of a gas are evolved, which gas, on gas-chromatographic analysis, is shown to be constituted essentially of n-butane. The raw reaction product shows the following analysis:

Al: 14.8% (theoretical content: 15.3%)
Cl: 20.0% (theoretical content: 19.8%)

By decomposition with 2-ethylhexyl alcohol, the product releases 248 N ml. of a gas which, on gas-chromatographic analysis, is shown to be formed essentially of n-butane (theoretical value for the released gas: 255 N ml./g). Thus, the product is (n-C₄H₉)₂AlCl.

Variations can of course be made without departing from the spirit of this invention.

Having thus described the invention, what is desired to be secured and claimed by Letters Patent is:

1. A method of preparing aluminum alkyl halides of the formula $R_mAl_pX_n$ wherein R is an alkyl group containing from about 2 to 10 carbon atoms; X is a halogen; $m$, $n$, and $p$ are integers, $p=1$ or 2, $m+n=3$ when $p=1$, and $m=n=3$ when $p=2$, which method comprises reacting under anhydrous conditions an aluminum dialkyl monohydride, $R_2AlH$, wherein R is as defined above, with a hydrohalic acid.

2. The method of claim 1 wherein the reaction is carried out at room temperature.

3. The method of claim 1 wherein the hydrohalic acid is employed in at least the stoichiometric ratio with respect to the aluminum of the aluminum dialkyl monohydride.

4. The method of claim 3 wherein the hydrohalic acid is employed in excess of the stoichiometric ratio with respect to the aluminum of the aluminum dialkyl monohydride.

5. The method of claim 1 carried out at atmospheric pressure.

6. The method of claim 1 carried out at a positive pressure in excess of atmospheric.

7. The method of claim 1 carried out under an anhydrous nitrogen atmosphere.

8. The method of claim 1 wherein the reaction mixture is heated to a temperature of from about 80 to 100° C. to thereby complete the reaction.

9. The method of claim 1 wherein the aluminum dialkyl monohydride is employed in the pure state.

10. The method of claim 1 carried out in the presence of a hydrocarbon solvent.

No references cited.

HELEN M. McCARTHY, *Acting Primary Examiner.*

TOBIAS E. LEVOW, *Examiner.*

H. M. S. SNEED, *Assistant Examiner.*